United States Patent [19]

Kawamoto et al.

[11] Patent Number: 5,034,858
[45] Date of Patent: Jul. 23, 1991

[54] ELECTRONIC INFORMATION EQUIPMENT

[75] Inventors: Masaaki Kawamoto; Yuichi Segawa; Hajime Sekino; Ichirou Nanbu; Yukihiro Fujii; Junji Yasuoka, all of Tottori, Japan

[73] Assignees: Sanyo Electric Co., Ltd., Osaka, Japan; Tottori Sanyo Electric Co., Ltd., Tottori, Japan

[21] Appl. No.: 513,423

[22] Filed: Apr. 20, 1990

[30] Foreign Application Priority Data

Apr. 24, 1989 [JP] Japan .................................. 1-48135
May 10, 1989 [JP] Japan .................................. 1-53649
May 10, 1989 [JP] Japan .................................. 1-117080

[51] Int. Cl.$^5$ .......................... H05K 5/02; G06F 1/00
[52] U.S. Cl. ...................................... 361/394; 364/708
[58] Field of Search ............... 400/680, 682; 361/340, 361/380, 390, 393, 394, 429; 364/708; 341/22, 24; 340/407, 700, 711; 248/278, 406.1, 919, 920, 921, 922, 923; 312/7.2, 208, 327; 16/277, 295, 306, 307, 308, 360, 374

[56] References Cited

U.S. PATENT DOCUMENTS 2,617,619 11/1952 Versen .............................. 248/278
4,305,266 12/1981 Lockwood ....................... 248/923

FOREIGN PATENT DOCUMENTS 59-91524   5/1984  Japan .
0091524    5/1984  Japan .
0160418    8/1985  Japan .................................. 364/708
60-148632 10/1985  Japan .
0148682   10/1985  Japan .
62-201826 12/1987  Japan .

OTHER PUBLICATIONS

Westen Electric Technical Digest No. 59; Jul. 1980, p. 5, J. T. Colfer.

Primary Examiner—Leo P. Picard
Assistant Examiner—Michel W. Phillips
Attorney, Agent, or Firm—Darby & Darby

[57] ABSTRACT

An electronic information equipment is constructed to accommodate a keyboard (4) sandwiched between a main body (1) and a display (2). The keyboard (4) is provided separately from the main body (1). The display (2) is attached to the main body (1) by a supporting device (3) at a position where the display face (2a) is movable to a predetermined position. The supporting device (3) comprises rotating device portions (9, 10) and tilting device portions (15, 16, 17). The rotating device portions (9, 10) rotate the display (2) in the horizontal direction (H) about an axis intersecting the installation plane. The tilting device portions (15, 16, 17) rotate the display (2) at a vertical direction (V) with respect to the main body (1) for supporting the display face (2a) at a position intersecting the installation face at an arbitrary angle. The necessity to place the main body (1) in front of the operator is eliminated resulting in a wide and effective usage of the desk employed as an installation plane.

11 Claims, 9 Drawing Sheets

ELECTRONIC INFORMATION EQUIPMENT

BACKGROUND OF THE INVENTION

1. Field of the Invention

The invention relates generally to electronic information equipments, and more particularly, to an electronic information equipment constructed so as to accommodate separable entry means sandwiched between a main body and display means.

2. Description of the Background Art

Figures 1, 2, 3, 4:
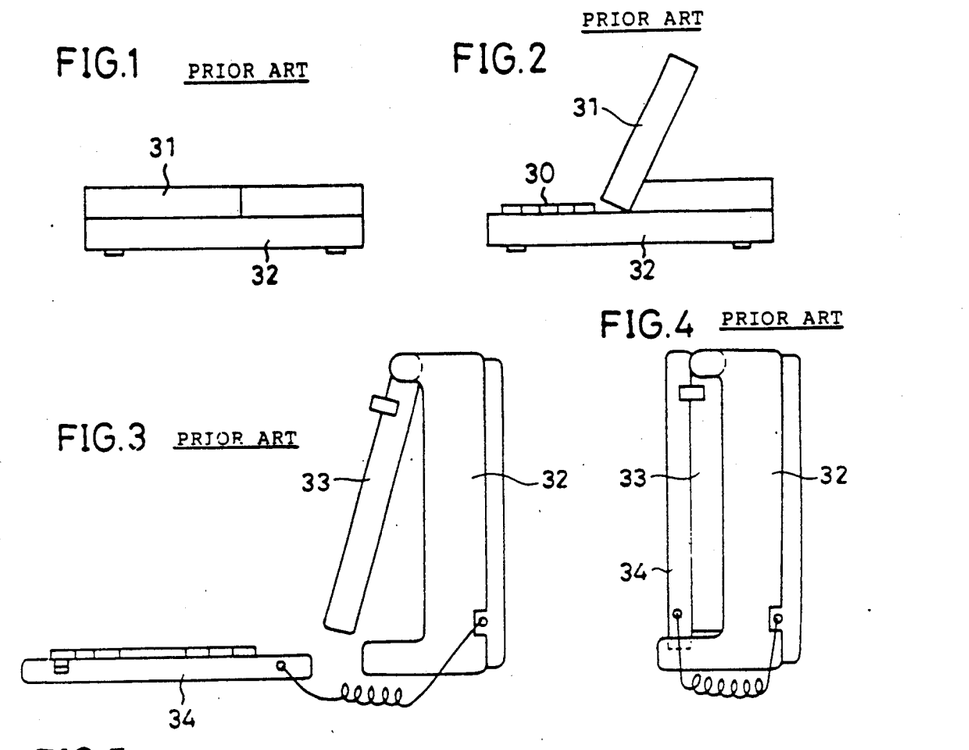
FIGS. 1 and 2 are side views showing an electronic information equipment of the prior art when not in use and in use, respectively.
FIGS. 3 and 4 are side views showing another electronic information equipment of the prior art when in use and when not in use, respectively.

Recently, a liquid crystal display device has been utilized as a display for compactness in electronic information equipments such as personal computers and word processors. FIGS. 1 and 2 are side views showing an electronic information equipment disclosed in Japanese Patent Laying-Open No. 59-91524 for example. Referring to FIG. 1, a display 31 is closed onto a main body 32 when not in use. Referring to FIG. 2, the electronic information equipment will be brought in a use position by raising the display 31 which covers a keyboard 30 during the time when not in use. Also, as disclosed in Japanese Utility Model Laying-Open No. 60-148632, a compact and readily portable desk-top electronic information equipment was developed. FIGS. 3 and 4 are side views showing the electronic information equipment disclosed in this laid open application. It can be seen from FIG. 3 that a liquid crystal display 33 is rotatably attached to a longitudinal main body 32. A keyboard 34 is placed before the liquid crystal display 33 when in use. Referring to FIG. 4, the liquid crystal display 33 and the keyboard 34 are fitted upright in turn to be integrally accommodated.

Figure 5:
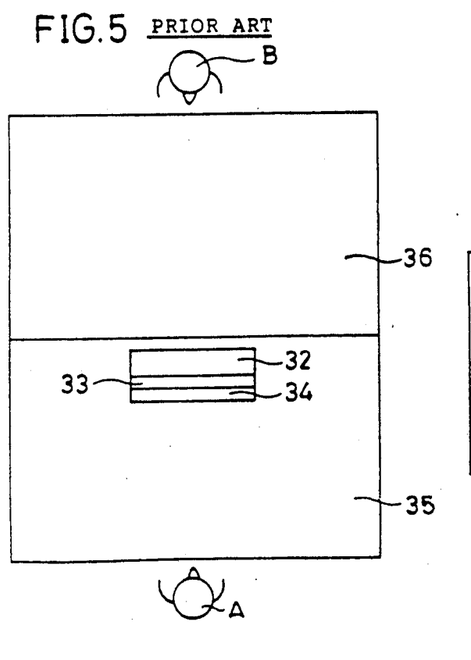
FIGS. 5 and 6 are top plan views showing the arrangement when a conventional electronic information equipment is placed on the desk.

The situation as shown in FIG. 5 is considered in which an electronic information equipment disclosed in Japanese Utility Model Laying-Open No. 60-148632 is placed on a desk 35 where two desks 35 and 36 are disposed to face each other. In this case, since the electronic information equipment is accommodated vertically when not in use, there was a problem that the field of vision of user A would be blocked so that the equipment could become an obstacle when speaking to the opposite occupant B.

Figure 7:
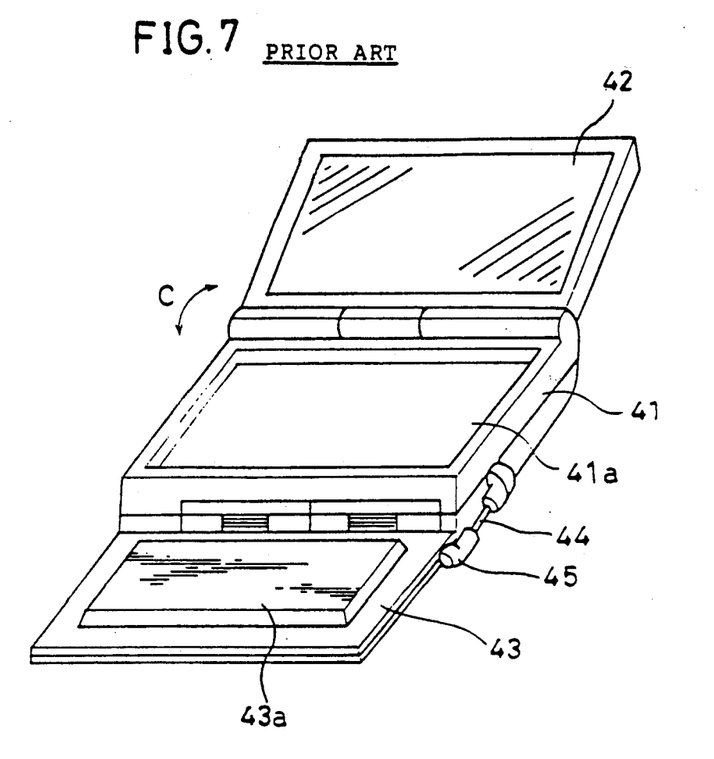
FIGS. 7 and 8 are perspective views showing the appearance of a further electronic information equipment of the prior art showing the keyboard when in use and when the keyboard is housed therein, respectively.
Figure 8:
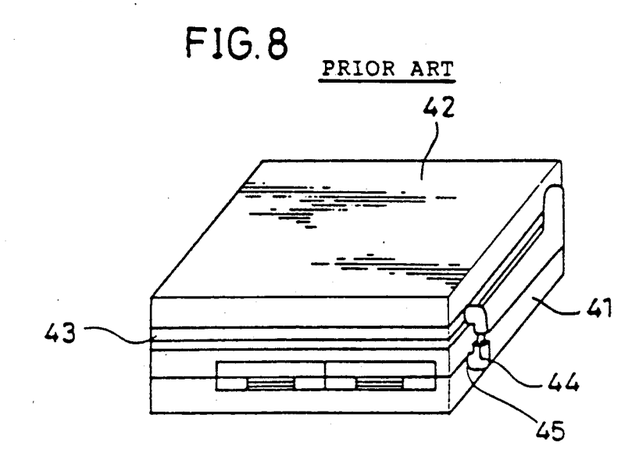

As disclosed in Japanese Utility Model Laying-Open No. 62-201826, an electronic information equipment accommodating a keyboard sandwiched between a display and a main body was developed. FIGS. 7 and 8 are perspective views showing the appearance of the electronic information equipment disclosed in this laid open application, with the keyboard set to be used and with the keyboard housed, respectively. Referring to FIG. 8, a keyboard 43 is accommodated sandwiched between a main body 41 and a display portion 42. When in use, the keyboard 43 is placed before the main body 41 with a key top portion 43a facing upward as shown in FIG. 7. The display portion 42 is rotated in the arrow C direction at a predetermined angle to the main body 41. The keyboard 43 is connected to the main body 41 by a connector portion 45 and a connection cable 44. The keyboard 43 fits into an accommodating portion 41a of the main body 41 when not in use. The height of this electronic information equipment is considerably low compared to that shown in FIG. 4 when not in use, so the front field of vision is not blocked.

Figure 6:
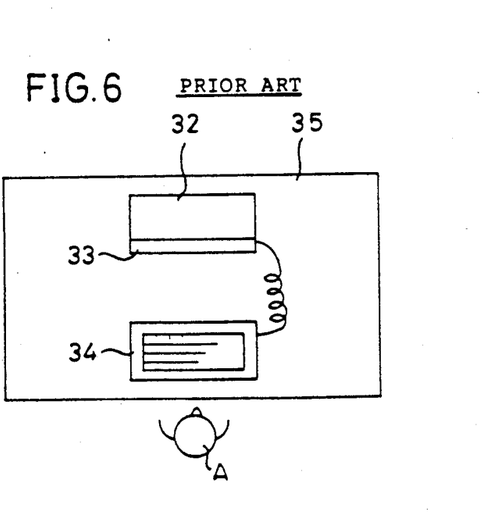

However, when the above mentioned electronic information equipment is in use, it will be difficult to view the displayed information if the display face is not placed in the front due to the characteristics of the liquid crystal employed in the liquid crystal display device for display. For example, as shown in FIG. 6, when the electronic information equipment of FIG. 3 is placed on the desk 35 to be used, the display 33 is positioned in the middle of the desk 35 in front of user A. Since, it is necessary to place the main body 32 as well as the display 33 in front of the operator A, there was an inconvenience that the desk on which the electronic information equipment was placed could not be effectively used. In addition, the electronic information device of FIG. 7 is always positioned in front of the operator, leading to a problem that the front view will always be blocked.

SUMMARY OF THE INVENTION

An object of the present invention is to provide an electronic information equipment that can be used without having to place a main body and a display in front of an operator.

An electronic information equipment in accordance with the present invention is constructed to accommodate an entry means sandwiched between a main body and a display means, and comprises a main body, an entry means, a display means, a rotating means and a tilting means. The main body has an installation plane that will contact a predetermined location for setting down the main body. The entry means is separable from the main body and is used to input information. The display means is movably attached to the main body with the display face having a predetermined position relative to the installation plane for displaying information. The rotating means is for rotating the display means about the axis which intersects with the installation plane. The tilting means is for supporting the display means at a position where the display face is at an arbitrary angle with respect to the installation plane.

In accordance with a preferred embodiment of this invention, the rotating means comprises a rotating body and an accommodating member. The rotating body rotates about the axis which intersects the installation plane. The accommodating member rotatably receives the rotating body and is mounted to the main body. The tilting means comprises a shaft portion and a supporting member. The shaft portion is located along an axis which intersects the above axis at an approximately right angle. The supporting member is rotatably attached around the shaft portion and is fixed to the display means. A coupling member is also provided to couple the rotating body and the shaft portion. The supporting member is attached to the shaft portion by an energizing member. The entry means has a main surface in which a number of key tops are provided, and may comprise a movable member which protrudes outwards from the main surface and retracts inwardly, and a moving means to move the movable member. The main body may comprise an engaging member provided at a corresponding position to engage the outwardly protruding movable member when the entry means is placed over the main body.

In the invention, the display means is rotated above the installation plane with respect to the main body by rotating means. Also, the display means is supported at a position with the display face intersecting the installation plane at an arbitrary angle by the tilting means. Therefore, the display means can be held at an arbitrary angle to the operator and at an arbitrary tilting position. This eliminates the necessity of placing the main body of the electronic information equipment in front of the operator when in use to allow the effective wide use of the desk where the equipment is located.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figures 9, 10:
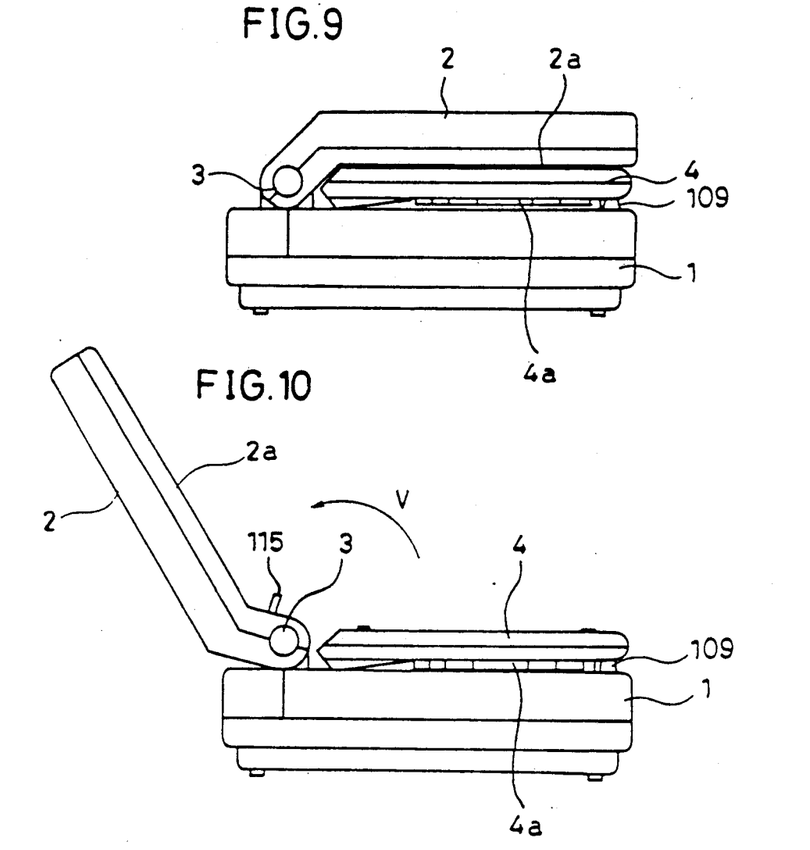
FIG. 9 is a side view showing an electronic information equipment in accordance with the invention when not in use.
FIGS. 10 and 11 are side views of the inventive electronic information equipment showing the movement from the position of FIG. 9 to the use position.
Figure 11:
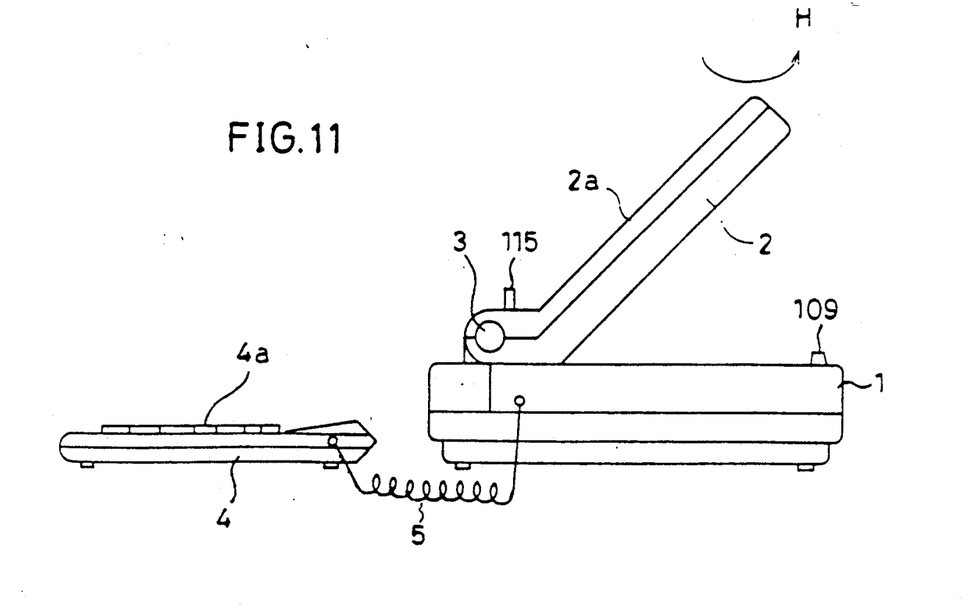

Referring to FIGS. 9–11, a main body 1 incorporating a control device, floppy disc devices, etc. supports a display 2. The display 2 is rotatably supported at an arbitrary angle vertically and horizontally by a supporting device 3 provided in the main body 1. The display 2 is comprised of a liquid crystal display device. When not in use, the display 2 is accommodated parallel to the main body 1 with the display face 2a downwards. There is a predetermined space between the main body 1 and the display 2. The keyboard 4 fits into this space with the key top face 4a downwards when not in use. When the equipment is to be used, the display 2 is rotated from the unused position of FIG. 9 to a counterclockwise direction indicated by arrow V shown in FIG. 10, followed by a horizontal rotation in the direction shown by arrow H to provide a use position as shown in FIG. 11.

Figure 12:
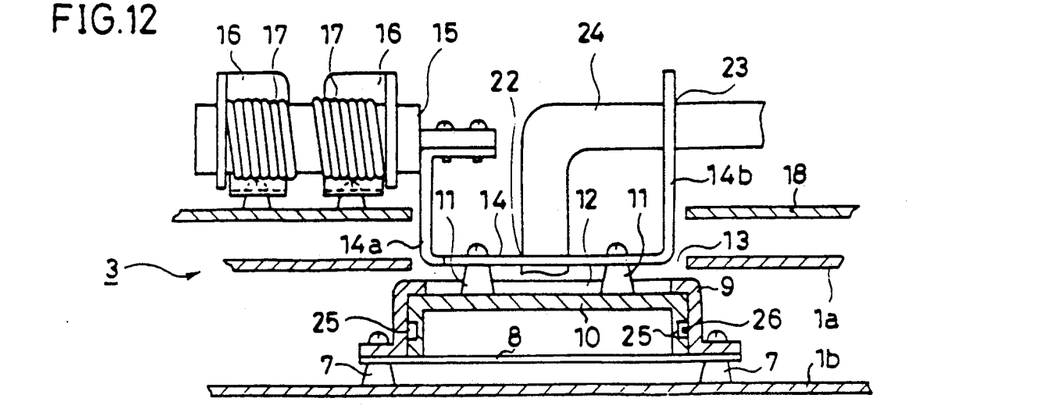
FIG. 12 is a front view showing a supporting portion of the display in relation to the main body of the present invention.
Figures 13, 14:
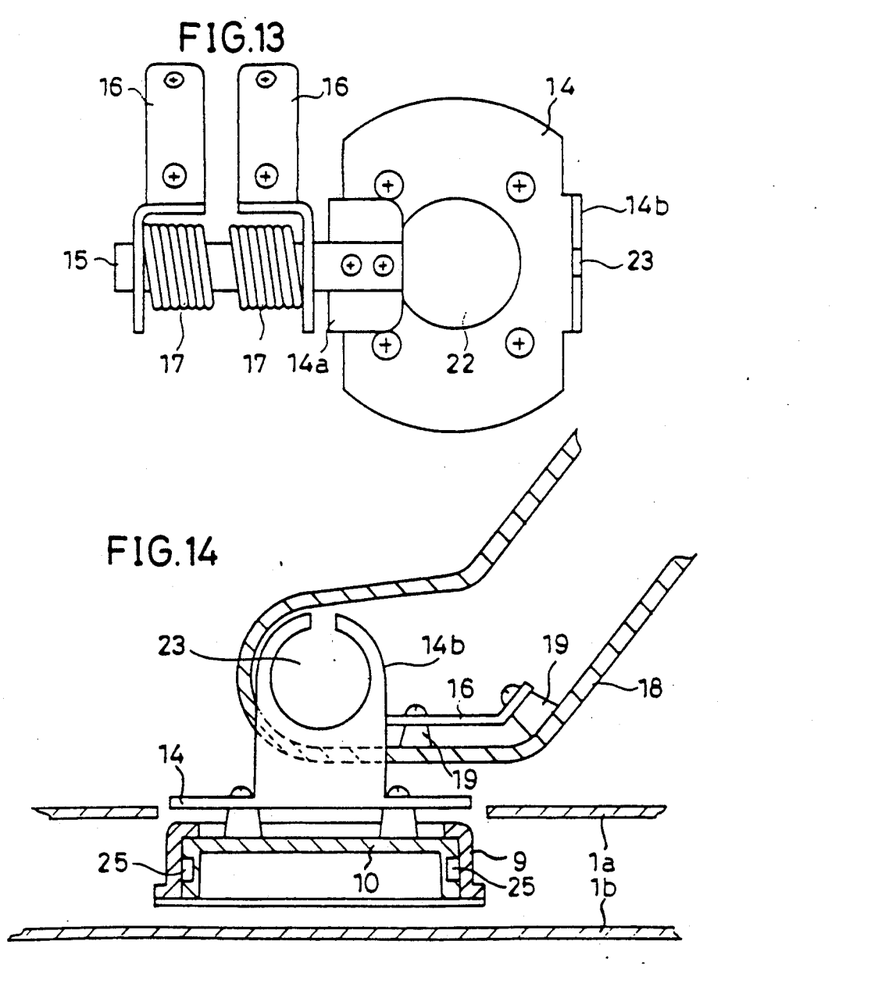
FIG. 13 is a plan view showing a major portion of FIG. 12.
FIG. 14 is a side view showing a major portion of FIG. 12.

Referring to FIGS. 12–14, the supporting device 3 has a base board 8 secured by bosses 7 formed on a lower cabinet 1b. On the base board 8, a cylindrical cover member 9 having openings in the top central portion and in the bottom is fixed. A rotating body 10 is accommodated in the interior of the cover member 9. The rotating body 10 is formed in a cylindrical configuration with an open bottom. Four bosses 11 formed on the top surface of the rotating body 10 protrudes above an upper cabinet 1a through the upper opening 12 of the cover member 9 and an opening 13 formed in the upper cabinet 1a. A coupling member 14 is fixed to the bosses 11 of the rotating body 10 and couples the rotating body 10 and a shaft 15. The coupling member 14 comprises a roughly circular bottom and integrally formed right and left upright pieces 14a, 14b. The left side upright piece 14a is bent to an inverted L-shape.

Figure 15:
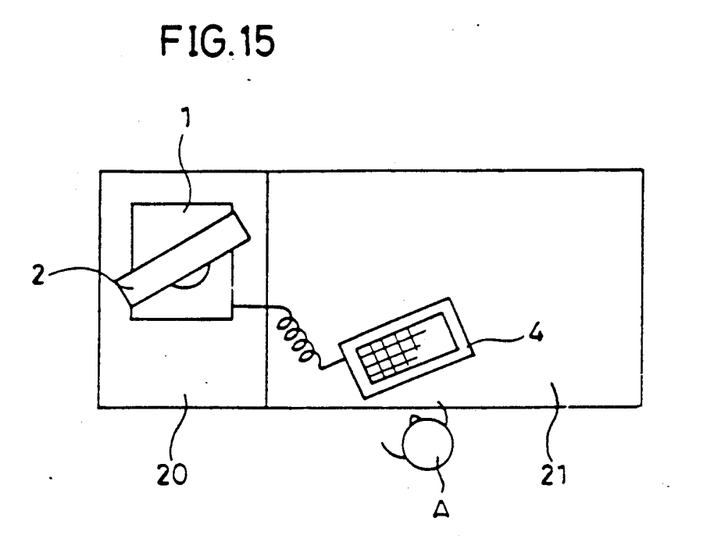
FIG. 15 is a top plan view showing the arrangement when the inventive electronic information equipment is placed on a desk to be used.

The shaft 15 is fixed to the upright piece 14a. A supporting plate 16 is rotatably attached to the shaft 15 via coil springs 17. The tilting means comprises the shaft 15, the supporting plate 16 and the coil springs 17. The supporting plate 16 is secured by bosses 19 formed on the cabinet 18 which accommodates the display. Accordingly, the supporting plate 16 rotates about the shaft 15 when the display 2 (cabinet 18) is rotated in the vertical direction. By the frictional force between the coil springs 17 and the shaft 15 originating from the compression action of the coil springs 17 coupled to the supporting plate 16, the display 2 is held at an arbitrary rotating position. Also, by rotating the display 2 in the horizontal direction, the rotating body 10 rotates via a coupling member 14. In this way, the display 2 can be rotated at an arbitrary angle in a horizontal direction with respect to the main body 1. As shown in FIG. 15, this allows the installment of the main body 1 of the electronic information equipment on a side table 20 and rotation of the display 2 to the direction of the operator A. The keyboard 4 is placed in front of the operator A on top of the desk 21. The main body 1 is provided aside the operator A, while the display 2 is held at an easy-to-see position for the operator A. By rotatably supporting the display in a vertical and horizontal direction with respect to the main body, the necessity to place the main body in front of the operator is eliminated to effectively utilize the desk top widely. In addition, the view in front of the operator A is not blocked and the display can always be held at an easy-to-see position.

Figure 16:
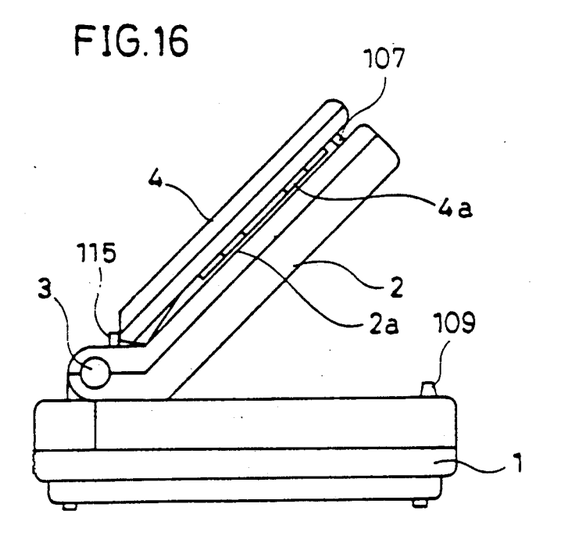
FIG. 16 is a side view showing the accommodating configuration when the inventive electronic information equipment is temporarily not used.

In the case the electronic information equipment is not to be used for a little while, the keyboard 4 may be placed over the display 2 to effectively utilize the top of the desk, as shown in FIG. 16. Also, when the electronic information equipment is not to be used for a long time, the display 2 and the keyboard 4 may be accommodated in the main body 1 as shown in FIG. 9, to effectively use the top of the desk.

The main body 1 and the display 2 are connected by a cord 24 inserted from the opening 22 of the coupling member 14 into the opening 23 of the upright piece 14b, as shown in FIGS. 12 and 13. Thus, there is a possibility that the connection cord 24 will be twisted and disconnected. To eliminate this problem, a groove 25 is formed at the periphery of the rotating body 10 for a predetermined range. In addition, a stopper pin 26 which protrudes inwardly from the cover member 9 is provided. By engaging the stopper pin 26 at a predetermined rotating position in the groove 25, the rotating body 10 is restricted to rotate within a predetermined range. This will prevent the connection cord 24 from being twisted and disconnected by the excessive rotation of the display 2.

Figure 19:
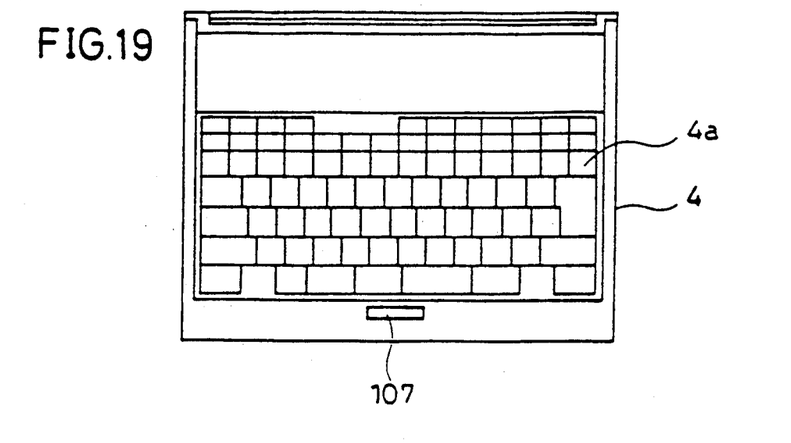
FIG. 19 is a top plan view showing the keyboard of the present invention.
Figure 20:
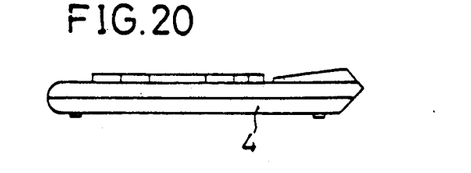
FIG. 20 is a side view showing the keyboard of the present invention.
Figure 21:
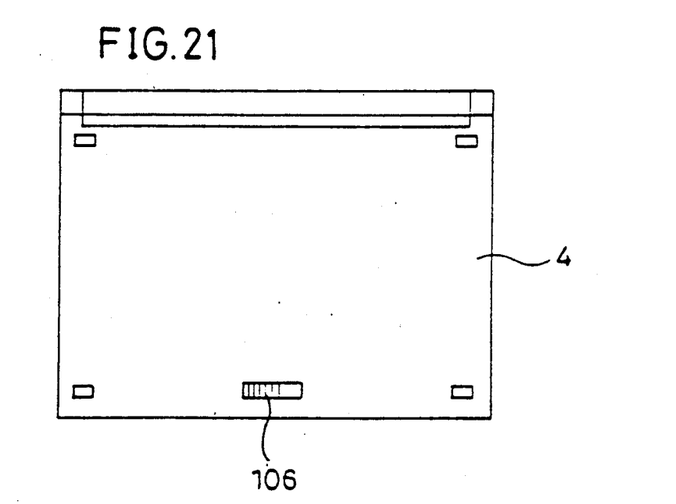
FIG. 21 is a bottom plan view showing the keyboard of the present invention.
Figure 22:
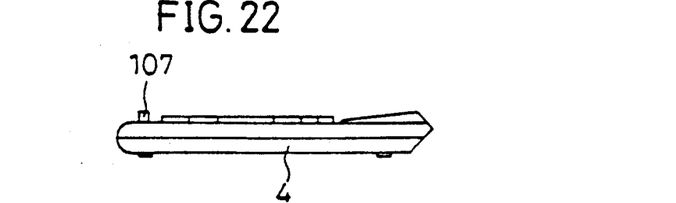
FIG. 22 is a side view showing the state when the projection protrudes from the surface of the inventive keyboard.

In the inventive electronic information equipment, the keyboard 4 provided with a number of key tops is connected to the main body 1 by the cord 5, as shown in FIG. 11. A projection 107 is provided in the front central portion of the keyboard 4, as shown in FIG. 19. The projection 107 is constructed so as to travel between a state protruding from the surface of the keyboard and a state retracted inwardly of the keyboard, as shown in FIGS. 20 and 22. The projection 107 is moved by a lever 106 provided on the back surface of the keyboard 4 as shown in FIG. 21.

Figure 17:
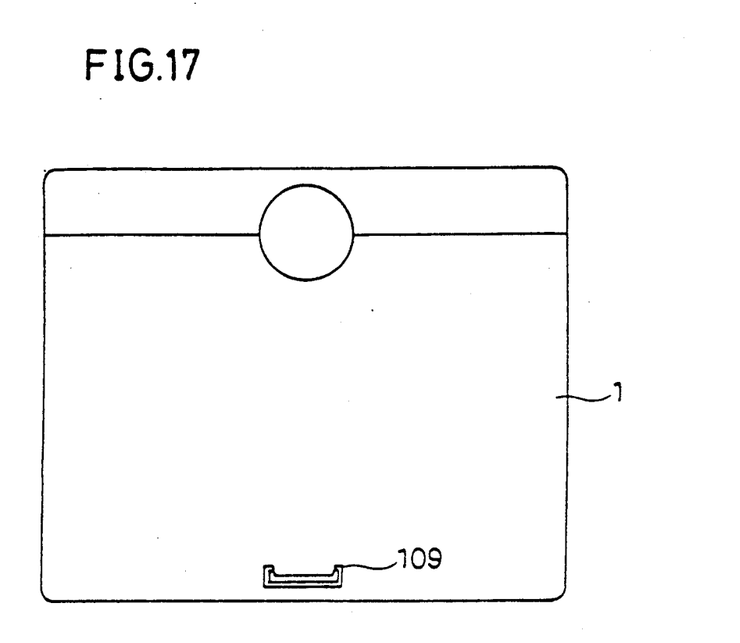
FIG. 17 is a top plan view showing the main body of the inventive electronic information equipment.
Figure 18:
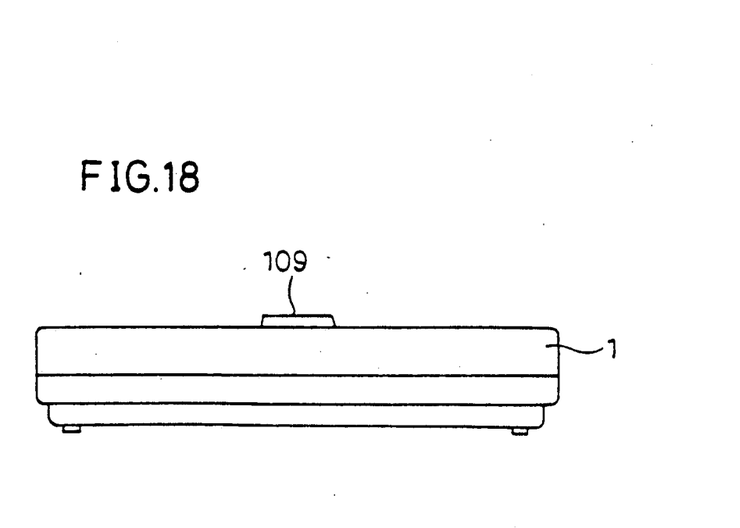
FIG. 18 is a front view showing the inventive electronic information equipment.

An accommodating projection 109 is provided in the main body 1 as shown in FIGS. 17 and 18 to accommodate the projection 107 when the keyboard 4 is placed over the main body 1.

Figure 23A:
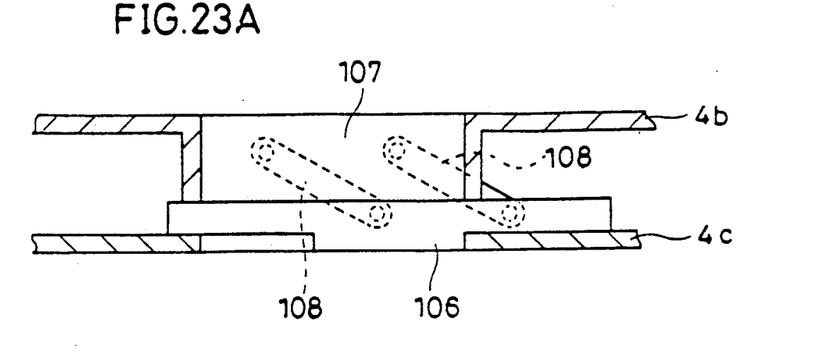
FIGS. 23A and 23B are sectional views showing an embodiment of the major portion of the keyboard.
Figure 23B:
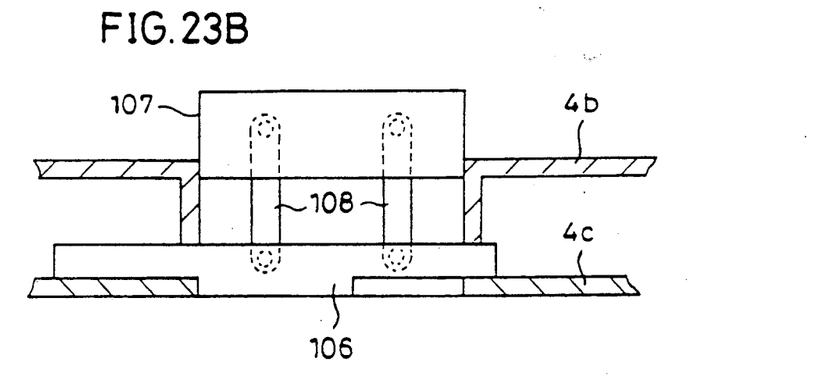

The projection 107 moves up and down by the operation of the lever 106 provided on the back surface 4c of the keyboard 4 by the mechanism shown in FIGS. 23A and 23B. That is, the projection 107 and the lever 106 are coupled by parallel links 108. When the lever 106 is moved to the right direction in the figure, the projection 107 is withdrawn inside the keyboard and its surface flush with the surface of the keyboard 4b, as shown in FIG. 23A. When the lever 106 is moved to the left direction in the figure, the projection 107 rises to be set at a protruded state from the keytop surface 4a as shown in FIG. 23B. The protruding projection 107 may be accommodated in the accommodating projection 109 provided on the surface of the main body 1. The accommodating projection 109 has one open end formed in a configuration to accommodate the projection 107.

In the use position shown in FIG. 11, since the projection 107 of the keyboard 4 will obstruct the key operation, it will be in the withdrawn position as shown in FIG. 23A. In the case the equipment is not to be used for a little while, the projection 107 is raised by operating the lever 106 provided on the back surface 4c of the keyboard 4 as shown in FIG. 23B. Then, the keyboard 4 is placed over the display 2 as shown in FIG. 16, wherein the key top surface 4a faces the display face 2a of the display 2. Since a gap is formed between the key top surface 4a and the display face 2a by the projection 107, the key top surface 4a will not directly contact the display face 2a to avoid the damage of the display face 2a. Furthermore, a stopper projection 115 is provided on the lower side of the display 2 to prevent the keyboard 4 from sliding off the tilting display 2.

When the usage of the equipment is thoroughly completed and the keyboard is to be accommodated, the display 2 is rotated to the position shown in FIG. 10 from the position in FIG. 11, followed by the protrusion of the projection 107 of the keyboard 4 in the manner as previously described. Then, the keyboard 4 is placed over the main body 1 with the key top surface 4a downwards as shown in FIG. 10. The keyboard 4 is positioned so that the projection 107 of the keyboard 4 may engage the accommodating projection 109 of the main body 1. After placing the keyboard 4, the display 2 is rotated in the clockwise direction from the position shown in FIG. 10 to the accommodating state shown in FIG. 9. With the keyboard 4 accommodated in the space between the display 2 and the main body 1 to be maintained compactly, in addition to the projection 107 of the keyboard 4 engaged in the accommodating projection 109 of the main body 1, the displacement of the keyboard 4 will be prevented and secured during its storage. Furthermore, the key tops will not be damaged because the key top surface 4a is not in direct contact with the main body 1 due to the projection 107. In the above explained manner, the protection of the key tops as well as the fixation of the keyboard is achieved during the accommodating position.

Figure 24A:
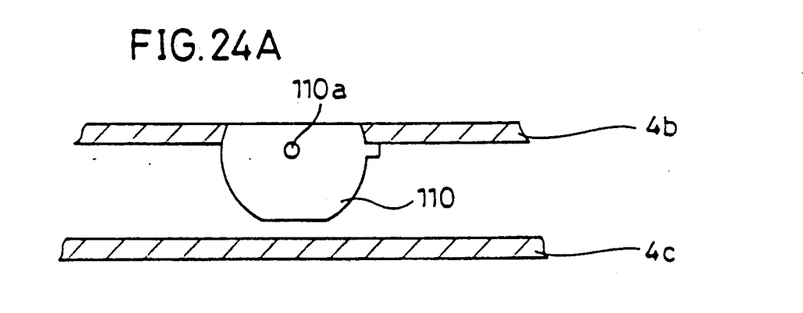
FIGS. 24A and 24B are sectional views showing another embodiment of the major portion of the keyboard.
Figure 24B:
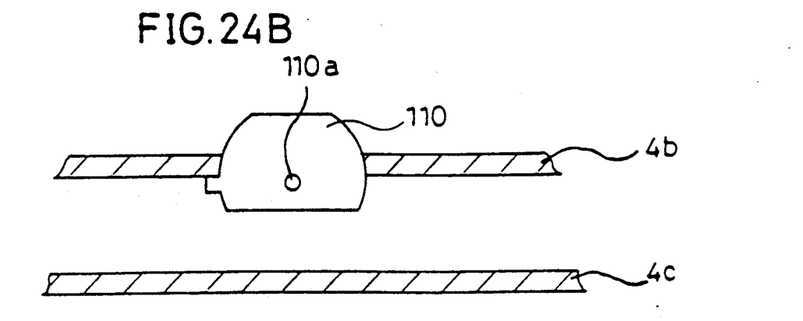

Referring to FIGS. 24A and 24B, the projection of the keyboard 4 may be moved by rotation. A half-circular rotating member 110 is provided on the surface 4b of the keyboard. By manually turning the rotating member 110, the rotating member 110 rotates about a shaft 110a for displacement between the two positions shown in FIGS. 24A and 24B.

Figure 25:
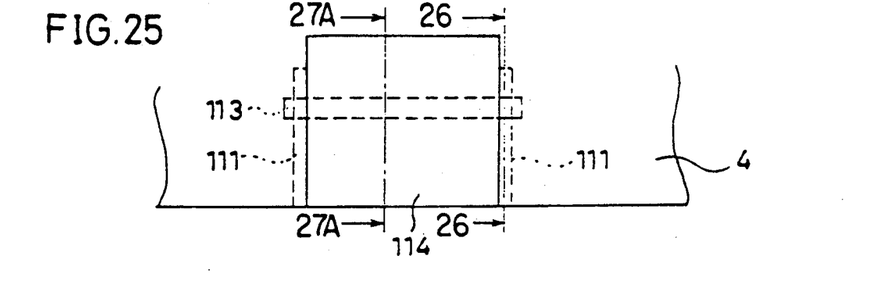
FIG. 25 is a top plan view showing a further embodiment of the major portion of the keyboard.
Figure 26:
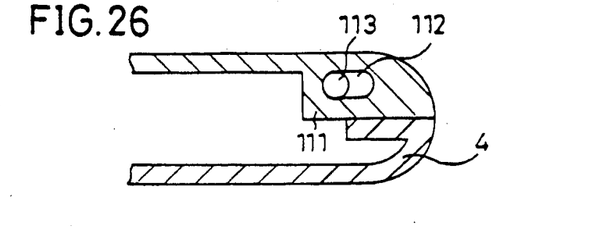
FIG. 26 is a sectional view showing the section of line 26—26 of FIG. 25.
Figure 27A:
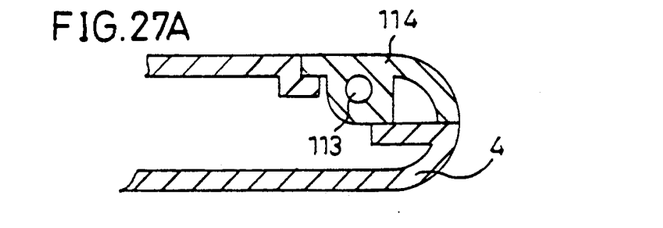
FIGS. 27A, 27B and 27C are sectional views showing the section of line 27A—27A of FIG. 25.
Figure 27B:
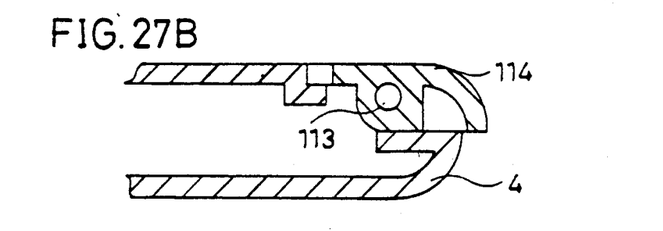
Figure 27C:
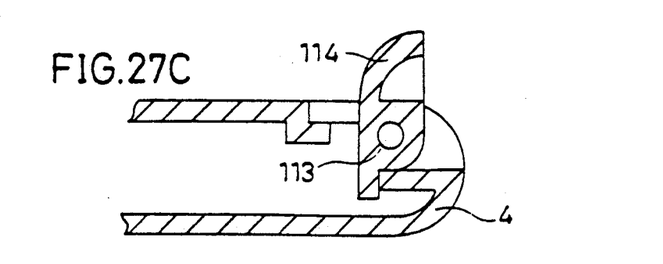

The projection of the keyboard may also be moved by the hereinafter described rotating means. Referring to FIGS. 25 and 26, a rotating shaft 113 is inserted in an oval-shaped aperture 112 of two supporting pieces 111 formed integrally with the cabinet of keyboard 4. A rotating projection 114 is slidably and rotatably formed with respect to the cabinet of the keyboard 4. When the keyboard 4 is in the use position, the shaft 113 of the rotating projection 114 is located on the left side of the oval-shaped aperture 112 as shown in FIGS. 26 and 27A. When the keyboard 4 is to be accommodated, the rotating projection 114 is slid to the right direction in the figure as shown in FIG. 27B. Then, referring to FIG. 27C, the rotating projection 114 will protrude above the keyboard 4 by rotating in the counterclockwise direction about the shaft 113.

In accordance with the invention, the necessity to place the main body in front of the operator is eliminated by rotatably supporting the display in vertical and horizontal directions to the main body to permit the wide effective use of the desk which serves as the installation plane. Also, the key tops will be protected when the keyboard is placed on the main body for accommodation by providing a protrudable projection in the keyboard as well as providing an accommodating projection in the main body to receive the projection in the keyboard. The protection of the display is also achieved when the keyboard is temporarily placed on the display.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic information apparatus, comprising:
a main body having a surface extending substantially in a horizontal plane;
entry means for entering information, said entry means being movable with respect to said main body;
display means having a display face for displaying information, said display means being pivotally attached to said main body about an axis, said display face having a free end movable about said axis in a vertical plane from a closed position, at which said entry means may be sandwiched between said main body and said display means, to an open position, at which said free end is spaced further away from said main body than when said free end is at said closed position;
rotating means for rotating said display means about another axis which intersects said main body for enabling said display means to rotate in a horizontal plane which is perpendicular to said vertical plane; and
tilting means for supporting said display means at a position where said display face is oriented at an arbitrary angle relative to said main body.

2. An electronic information apparatus according to claim 1, wherein said rotating means comprises
a rotating body for rotating about said another axis, and
an accommodating member attached to said main body for rotatably receiving said rotating body.

3. An electronic information apparatus according to claim 2, wherein said tilting means comprises
a shaft portion extending along a further axis that intersects said another axis at approximately right angles, and
a supporting member rotatably attached about the shaft portion and fixedly attached to said display means.

4. An electronic information apparatus according to claim 3, further comprising a coupling member for coupling said rotating body and said shaft portion.

5. An electronic information apparatus according to claim 3, wherein said supporting member is attached to said shaft portion through an energizing member.

6. An electronic information apparatus according to claim 2, further comprising restricting means for bringing the rotation of said rotating body to a stop at a predetermined position.

7. An electronic information apparatus according to claim 6, wherein said restricting means comprises
a projection portion formed in the inner side of said accommodating member receiving said rotating body, and
a groove portion formed on the periphery side of said rotating body to engage the projection portion at a predetermined position.

8. An electronic information apparatus according to claim 1, wherein said entry means has a main surface provided with a number of key tops, comprising
a movable member protruding outwards of the main surface and retracting inwardly, and
moving means for moving the movable member,
said main body comprising an engaging member provided at a corresponding position which engages outwardly protruding movable member when said entry means is placed over said main body.

9. An electronic information equipment according to claim 8, wherein said moving means comprises means for moving said movable member by a link mechanism.

10. An electronic information equipment according to claim 8, wherein said moving means comprises means for rotatably moving said movable member.

11. An electronic information apparatus according to claim 1, wherein said display means has a side adapted for holding said entry means thereon when said display means is oriented in a position where side faces away from said main body.

* * * * *